(12) United States Patent
Winner et al.

(10) Patent No.: US 7,636,350 B1
(45) Date of Patent: Dec. 22, 2009

(54) SYSTEM AND METHOD FOR ACCESS PROVISIONING IN MULTIPLE TELECOMMUNICATIONS TECHNOLOGIES

(75) Inventors: Angela Winner, Olathe, KS (US); Sunitha Shivananda, Olathe, KS (US); Raj Sripathi, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1035 days.

(21) Appl. No.: 10/429,614

(22) Filed: May 5, 2003

Related U.S. Application Data

(60) Provisional application No. 60/404,788, filed on Aug. 19, 2002.

(51) Int. Cl.
*H04L 12/66* (2006.01)
(52) U.S. Cl. .................. 370/354; 370/389
(58) Field of Classification Search ......... 370/352–358, 370/389, 401, 395.21, 395.3, 395.4, 395.41, 370/402
See application file for complete search history.

(56) References Cited

U.S. PATENT DOCUMENTS

| | | | | |
|---|---|---|---|---|
| 5,491,742 A | * | 2/1996 | Harper et al. | 379/201.12 |
| 6,546,095 B1 | * | 4/2003 | Iverson et al. | 379/201.12 |
| 6,735,293 B2 | * | 5/2004 | Doherty et al. | 379/201.12 |
| 6,882,640 B1 | * | 4/2005 | Berger et al. | 370/353 |
| 7,158,508 B2 | * | 1/2007 | Abrams et al. | 370/352 |
| 2003/0058796 A1 | * | 3/2003 | Anderson, Sr. | 370/236 |

* cited by examiner

*Primary Examiner*—Brenda Pham
(74) *Attorney, Agent, or Firm*—Sonnenschein Nath & Rosenthal LLP

(57) ABSTRACT

A system and method are disclosed for telecommunications circuit provisioning in multiple technologies. In one embodiment, the system comprises a first provisioning system configured to allocate telecommunications circuits of a first kind (e.g., circuit-switched), a second provisioning system configured to allocate telecommunications circuits of a second kind (packet-switched), and an order control system. The order control system may receive an access request and may respond by obtaining telecommunications circuit allocations from the first and second provisioning systems. The order control system may further receive notice from a provisioning system that a different provisioning system is to be used, and the order control system may respond by providing access request information to the identified provisioning system. The order control system may further combine responses and reports from the provisioning systems to provide complete responses and reports to the source of the access request.

19 Claims, 10 Drawing Sheets

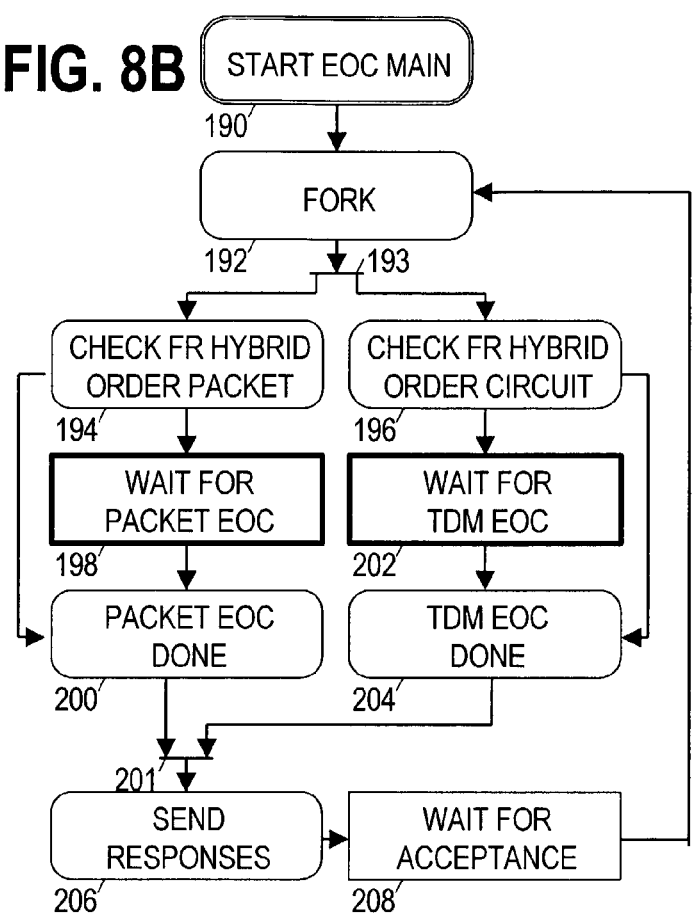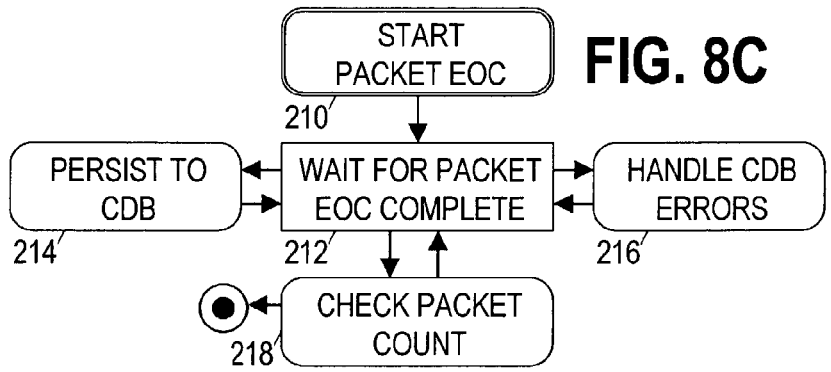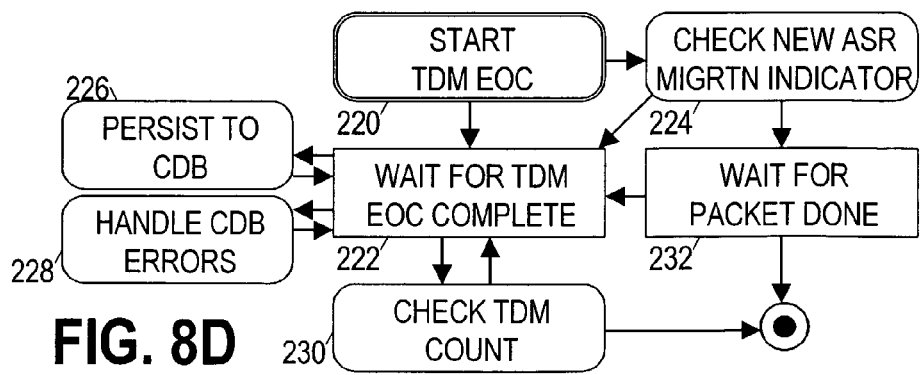

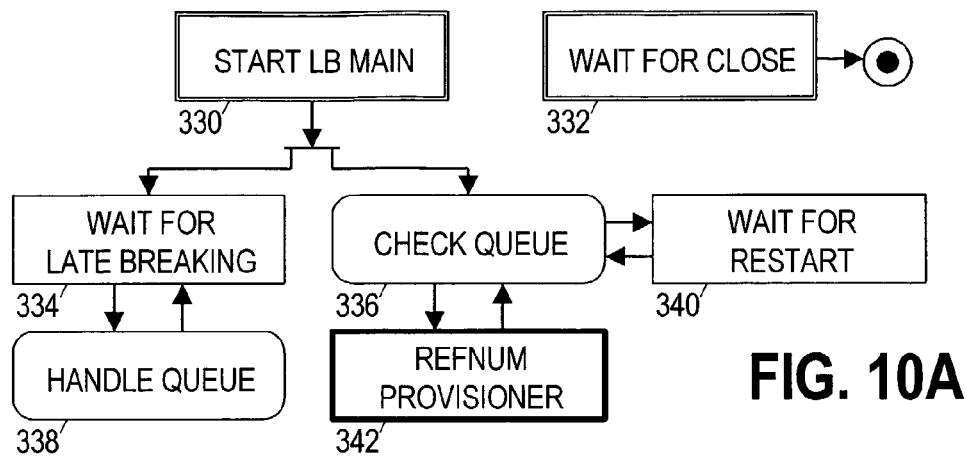
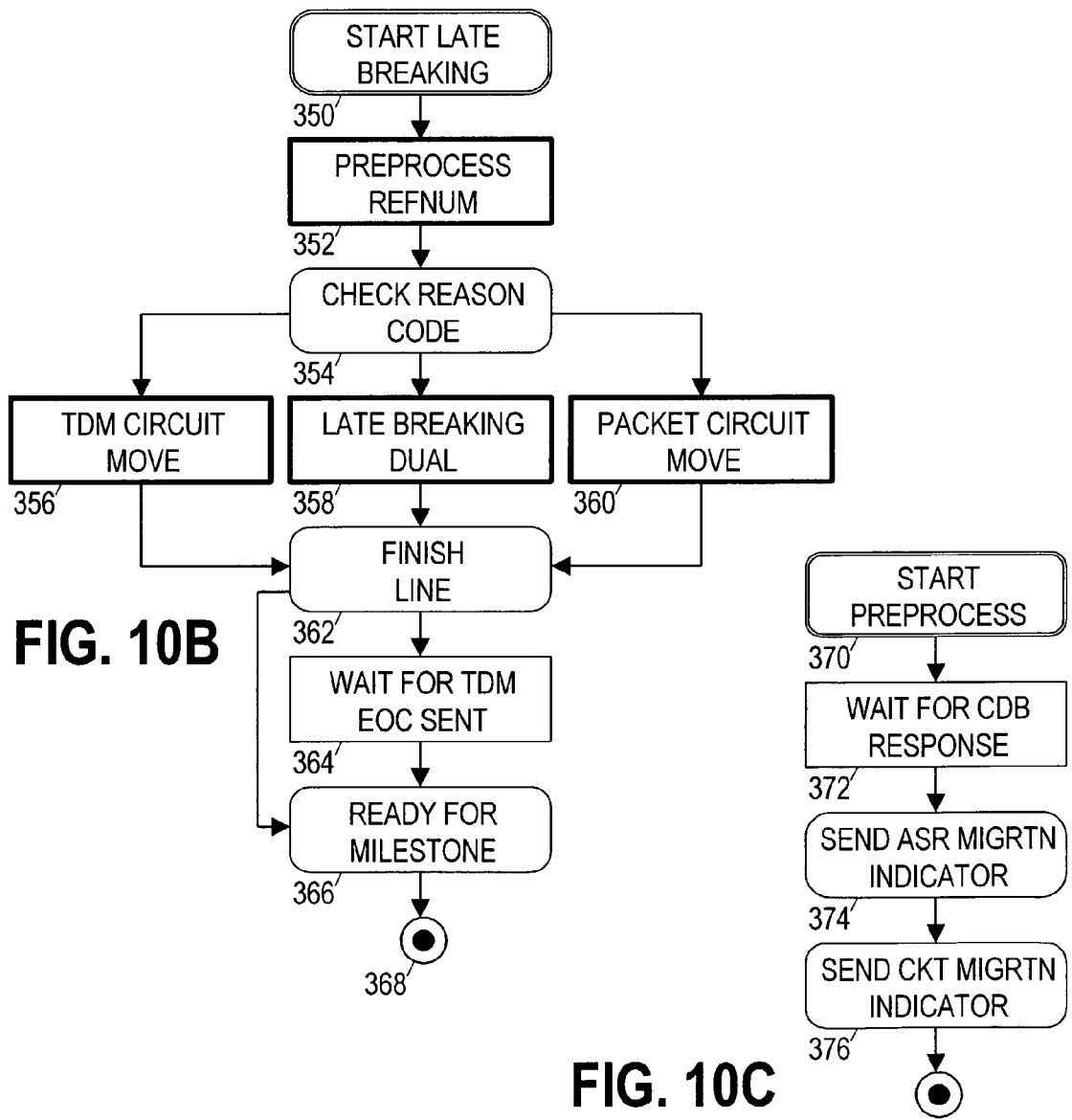
FIG. 10A
FIG. 10B
FIG. 10C

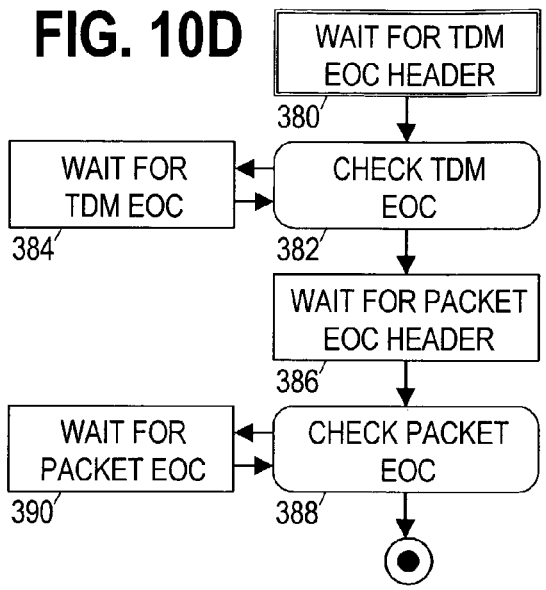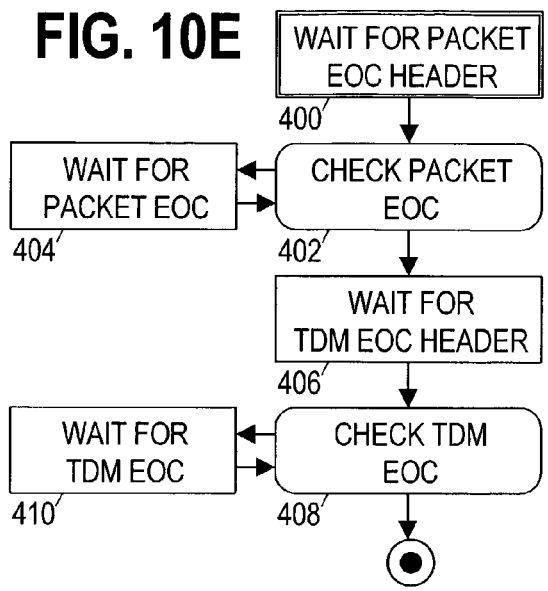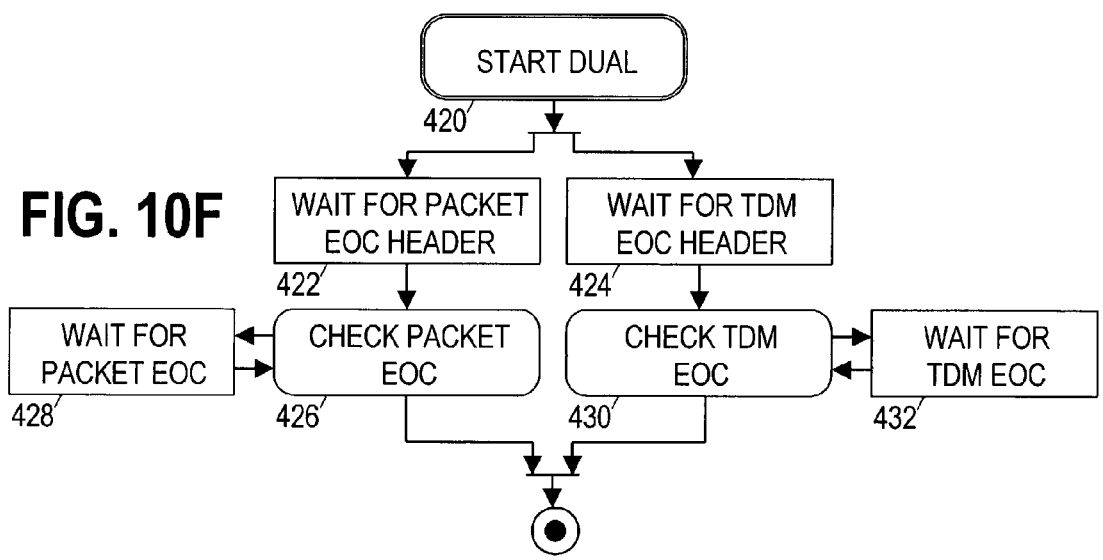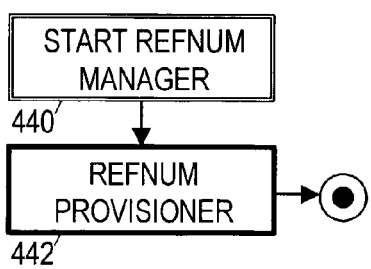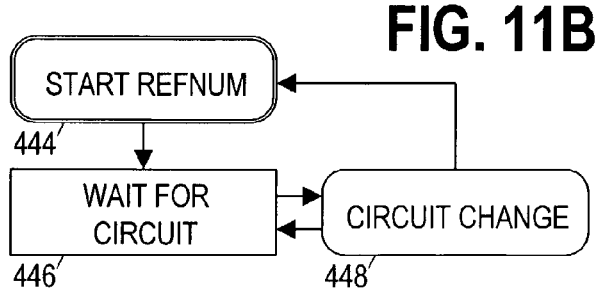

SYSTEM AND METHOD FOR ACCESS PROVISIONING IN MULTIPLE TELECOMMUNICATIONS TECHNOLOGIES

CROSS-REFERENCE TO RELATED APPLICATIONS

The present application claims priority to Provisional Application 60/404,788 filed Aug. 19, 2002 entitled "Telecom Provisioning Workflow Models" which is incorporated by reference.

BACKGROUND

Enterprise Integration

Large companies often employ a variety of computer systems as part of their business. Examples of such computer systems may include: order entry systems used by sales representatives, order fulfillment systems used by warehouse employees, resource planning systems used by managers, and billing systems used by accountants. Although these systems are typically acquired and operated independently of the other systems, the ability to coordinate these systems offers opportunities for improvement. Such improvements may include reduced waste, reduced delivery delays, faster billing, and more responsive customer service. The coordination of independent (and often incompatible) computer systems within a company is the focus of the field of enterprise integration. Similar coordination between computer systems of different companies (e.g., a manufacturer and its suppliers) is the focus of the field of "eBusiness". The eBusiness and enterprise integration fields have produced a number of products including Vitria BusinessWare.

Vitria BusinessWare is a software platform, i.e., a software package that provides low level services to support user-created processes. In the case of Vitria BusinessWare, these low-level services include connectors, channels, databases, and automators.

Connectors are software modules that translate messages between different formats. Connectors allow messages to be exchanged between incompatible computer systems.

Channels are software modules that queue messages. Channels provide a versatile mechanism for inter-process communications in distributed systems. Channels may be established for certain message types, and every process that subscribes to a given channel receives the messages placed into the channel. Channels may greatly facilitate the scalability of processes running on the platform.

A database is a software module that allows for organizing and accessing a collection of information. In the BusinessWare context, the databases are used to store customer orders and associated business process objects. The databases are further used to organize state information for the business process objects.

"Business process object" is a term for an instance of a business process. The business process object (BPO) progresses through a series of model states as a company carries out its business operations. Consider an example of a business process for a service provider. The customer order is initially just a request. The company may accept the order, may obtain and allocate resources for fulfilling the order, may deploy the resources, may provide the service, and may bill the customer. As the company takes each of these actions, the customer order progresses through a series of corresponding states. This process may be formalized into a business process model, and each customer order may be formalized as a business process object.

Also included in Vitria BusinessWare are automators. The automators are software modules that move the business process objects (BPOs) through the states in a business process model. The automators may act in response to messages received through channels, and may generate messages or take other actions as BPOs transition to and from model states. Note that at any given time, each BPO may be associated with multiple models and multiple model states.

Vitria also provides an authoring environment for creating and editing business process models. The authoring environment allows the user to specify different state types, specify transitions between states, and specify conditions and actions associated with the transitions. There are four characteristics that may be associated with any given state: start, terminate, wait, and nested. Start states are states initially associated with a BPO when the model is initiated. Terminate states are states that stop the BPO's progression through the model. States that are not start or terminate states are intermediate states. Wait states are states that cannot be exited until specified conditions are met. States that are not wait states are sometimes called action states, but in any event, they are states through which BPOs can move en route to subsequent states. Nested states are states that represent a sub-model. BPOs that enter a nested state initiate the sub-model in the form of a new BPO that progress through the sub-model states. When a sub-model terminates, the parent BPO may exit the nested state. States that are not nested states are termed simple states.

Details regarding Vitria BusinessWare and its use may be obtained from Vitria which is located in Sunnyvale, Calif., and on the web at www.vitria.com. Vitria BusinessWare is just one example of an enterprise integration platform. Others are commercially available, and many companies have implemented custom information technology solutions.

Telecommunications Service Providers

Telecommunications Service Providers (TSPs) are discovering that new technologies may offer opportunities for better service at lower cost. As part of their core business, TSPs provide electronic communication paths between customers. In their original form, these paths were dedicated telegraph wires between customers. After a short time, switching centers were invented, and these paths took the form of wires between the customers and the local switching centers. The operators at the local switching centers were able to manually relay messages from one wire to another and were also able to electrically connect any of the wires so that local customers could communicate directly.

With the advent of the telephone, the single wires were replaced with closed circuit "loops" between the customers and the switching centers, and the customer base began increasing rapidly. Before long, the local switching centers were connected via multiconductor "trunk lines", and long distance communications became possible between customers of different switching centers. Initially, for both local and long distance, the connecting of different circuits was performed manually by operators. As electronics technology improved, the connecting was done using arrays of electronic relays that switched in response to electric pulses sent by a customer's phone as the customer dialed. Up until this time, all communications paths were established using what is now known as "circuit switching". In other words, a communication path was established (i.e., a closed electrical circuit between the customers) that remained fixed until the communication ended.

With the evolution of transistors the TSPs developed ways to transport multiple conversations on the same circuit. One method involved frequency division multiplexing (FDM), in which analog processing was done on each end of a trunk line to shift a communication from the normal frequency band ("baseband") to one of several higher frequency slots for transport across the trunk line, and to shift the communication back to baseband at the other end. As technology continued to evolve, TSPs began performing analog-to-digital conversion to send the communication across the trunk lines digitally. Digital communication allowed for the use of FDM, but also allowed for the use of time division multiplexing (TDM) in which different communications are intermixed in time in a predetermined way and reconstructed at the other end.

The analog and digital processing for FDM and TDM typically replaced a physical circuit as a communication path with allocated slots in frequency and time on a given conductor. In operation, these slots are for most purposes equivalent to physical circuits, and hence they may be referred to as "virtual circuits". The term "circuit switching" still applies because the communications path remains fixed until the communication ends. Some TSPs are replacing or augmenting trunk lines with trunks of optical fibers. Digital TDM technology has been applied to these optical trunks as well.

The recent growth in data communications presents a challenge to the communications capacity of TSP networks that were primarily designed to carry telephone conversations. To minimize unused bandwidth (e.g., unused frequency and time domain slots), another technology has been developed. Referred to as asynchronous transfer mode (ATM), this technology has been developed as an industry standard that facilitates the transport of mixed communication types such as voice, video and data. It relies on computerized switches to perform "packet switching". (Unlike circuit switching, packet switching allows for the use of different circuits during the communication, and may even allow for out-of-order delivery of portions of the communication). A customer communication is digitized, converted into data packets, and routed towards the destination via any available bandwidth. At the other end, the packets are sorted out and used to reconstruct the different communications.

TSPs wishing to switch from one technology to another are invariably faced with a changeover period in which both old and new technologies co-exist. In the case of the changeover to ATM, a TSP's network is likely to have trunks using the older TDM technology contemporaneously with trunks using the newer ATM technology. Systems designed for managing the older technology may not be suitable for managing the newer technology, and conversely, adding short-term functionality to newer systems may be inefficient in view of already existing systems for managing the older technology. Accordingly, a method and system for coordinating network management in multiple technologies may prove advantageous during current and future changeover periods.

SUMMARY

The problems outlined above are in large measure addressed by a system for telecommunications circuit provisioning in multiple technologies. In one embodiment, the system comprises a first provisioning system configured to allocate telecommunications circuits of a first kind (e.g., circuit-switched), a second provisioning system configured to allocate telecommunications circuits of a second kind (packet-switched), and an order control system. The order control system may receive an access request and may respond by obtaining telecommunications circuit allocations from the first and second provisioning systems. The order control system may further receive notice from a provisioning system that a different provisioning system is to be used, and the order control system may respond by providing access request information to the identified provisioning system. The order control system may further combine responses and reports from the provisioning systems to provide complete responses and reports to the source of the access request.

BRIEF DESCRIPTION OF THE DRAWINGS

A better understanding of the present invention can be obtained when the following detailed description is considered in conjunction with the following drawings, in which:

FIGS. 8A-8E show an embodiment of an engineering order confirmation management process and its subprocesses;

FIGS. 10A-10F show an embodiment of a late-breaking change management process and its subprocesses;

FIGS. 11A-11B show an embodiment of a reference number management process and its subprocesses;

Figure 1:
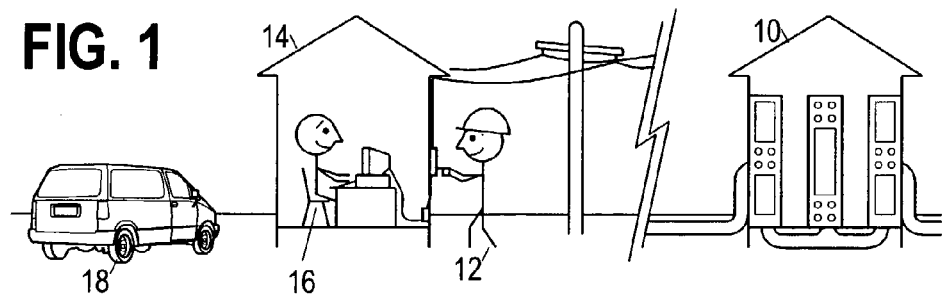
FIG. 1 shows an environment in which a telecommunications service provider (TSP) may operate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now the figures, FIG. 1 shows an environment in which a telecommunications service provider (TSP) may operate. The TSP provides an infrastructure that supports communications between customers. The infrastructure may include a network of wires, cables, optical fibers, wireless links, and/or satellite links. The network is controlled by a hierarchy of switching centers 10.

A TSP technician 12 connects the network to a premises 14, typically by connecting a wire or cable to a junction box. The technician typically verifies the physical connection by testing his access to the network from the junction box. The access may include voice access and broadband access.

A customer 16 can then access other customers via the network if the customer has the proper equipment (e.g., telephone, modem, video conferencing equipment). In many cases, this equipment must be delivered 18 to the premises. The equipment may be installed by professional installers, and may alternatively be installed by the owner of the premises.

The TSP that provides the network connection and equipment may own all or some portion of the network through which communications paths are provided. Alternatively, because building networks is a capital-intensive proposition, the TSP may not be an owner, but rather may be leasing access to the network from the network owner.

Figure 2:
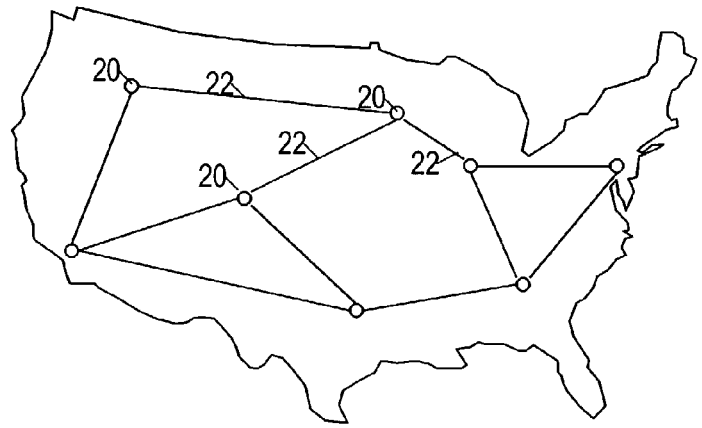
FIG. 2 shows a network of switching centers connected by trunk lines.

FIG. 2 shows a telecommunications network in which regional switching centers 20 are coupled via trunk lines 22. Each regional switching center 20 may be further coupled to a hierarchy of local switching centers (not shown). The owner of such a network will have invested an enormous amount in creating and maintaining the network, and will have a commodity which others desire, namely, access to high-bandwidth communications paths.

The telecommunications industry has worked out standards for TSPs to lease access from network owners. One standards-based process begins with an access service request (ASR), which may specify circuit information such as a starting point, an ending point, and a desired amount of bandwidth between the two points. One ASR may optionally cover multiple circuits, e.g., it may specify multiple pairs of starting and ending points. The network owner, upon receiving such an ASR, allocates resources to satisfy (or "provision") the request. Namely, the network owner allocates channels on one or more trunk lines and allocates hardware in the switching centers to couple the trunk line channels in a sequence that connects the two points in each pair. (Compensation for provisioning the request is an issue that is addressed separately by the TSPs and network owners, and is beyond the scope of this disclosure).

Figure 3:
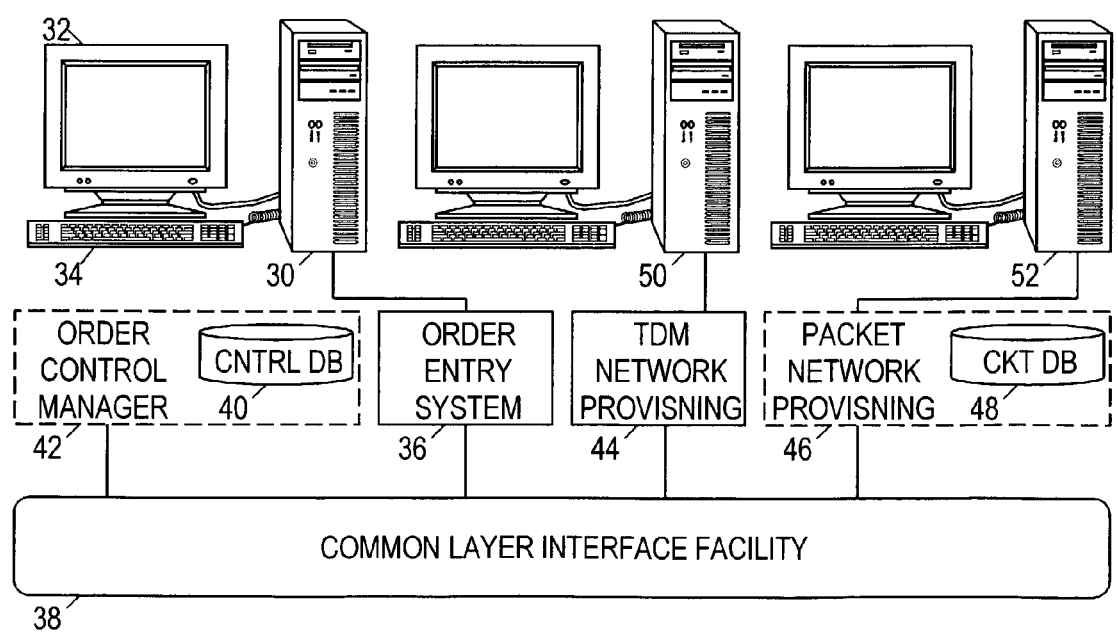
FIG. 3 shows a system for provisioning trunk portions of a network.

FIG. 3 shows a system for provisioning trunk portions of a network. An ASR may be created at a first workstation 30 having a display 32 and a user input device 34. A user may interact with software processes on workstation 30 and/or order entry system 36 to create and submit the ASR. Any suitable access and data entry technique may be used with or in place of workstation 30, including those involving client-server, terminal-mainframe, batch submission, and operator-assisted technologies.

The order entry system 36 may be coupled to other systems via a common layer interface facility (CLIF) 38. CLIF 38 may be a distributed software construct that enables communication between a substantial number of diverse computer types. In one embodiment, CLIF 38 comprises connectors and channels implemented on a Vitria BusinessWare platform. CLIF 38 may couple order entry system 36 to an order control manager system 42, a TDM network provisioning system 44, and a packet network provisioning system 46.

Order entry system 36 may facilitate creation and acceptance of ASRs, and may forward the ASRs to order control manager 42. Order control manager 42 may process the ASR to determine whether the ASR relates to trunk lines using the TDM-based technology or the packet-based technology, or both. Order control manager 42 may then apportion the provisioning operations to the TDM network provisioning and packet network provisioning systems accordingly. Order control manager 42 may further track the status of the provisioning operations and serve as an intermediary between the order entry system, the provisioning systems, and the control database 40. Control database 40 may archive transaction information and may serve as a central data repository for data being processed by multiple or distributed systems.

Each of these provisioning systems 44, 46 may be coupled to workstations 50, 52 at which engineers design, review, and approve allocations of trunk and switching center resources. The order control manager 42 and provisioning systems 44, 46 may rely on an inventory database 48 to obtain information regarding network resources and technologies. Inventory database may be a separate system or may be a part of packet network provisioning system 46. As the provisioning process proceeds, order control manager 42 may monitor the progress and provide reports to order entry system 36. Order entry system 36 in turn may make status information available to the source of the ASR.

Order control manager 42 may be a distributed processing system that implements business processes using a software platform such as Vitria BusinessWare. Order control manager 42 may comprise a group of software modules such as those shown in FIG. 4. An ASR may be directed from order entry system 36 to order control manager 42, where it is received by software module 60. Software process 60, hereafter termed ASR scheduler 60, may cause the ASR information to be sent to control database 40. Once control database 40 has stored the information, it returns an acknowledgement to order control manager 42.

Pending order manager 61 is a software process concerned with previously pending orders (i.e., orders that are initiated before the order control manager 42 becomes operational). Pending order manager 61 may act as a bypass, simply facilitating message exchanges between order entry system 36 and TDM network provisioning system 44. If the ASR received by the ASR scheduler 60 concerns a previously pending order, this suggests that the "previously pending order" has not truly been previously initiated. Accordingly, once the control database 40 issues an acknowledgement, the ASR scheduler may cause pending order manager 61 to stop operating as a bypass to allow the other software processes to perform their functions.

If the ASR does not concern a previously pending order, the acknowledgement from control database initiates purchase order number (PON) manager 62. PON manager 62 is a software process concerned with coordinating the various other processes. It may obtain a serial number for the circuit if needed, then trigger the other processes as needed to fulfill the ASR.

Engineering order confirmation (EOC) manager 64 is a software process concerned with passing the ASR information to the appropriate provisioning system(s), accepting the EOC responses from the provisioning systems, combining multiple responses if needed, and providing the EOC information to order entry system 36. (The EOC responses indicate the engineer's rejection; the engineer's acceptance and tentative provisioning of the ASR; or the engineer's acceptance with correction of ASR component information.)

Milestone automator 66 is a software process concerned with tracking, combining, and distributing information concerning completion of various phases, or "milestones" in the ASR provisioning process. Examples of milestones may include determination of an estimated completion date, and determination of an actualized completion date. The milestone automator may also handle jeopardy notices, i.e. notices that a due date will be missed. As part of handling jeopardy notices, the milestone automator may track work unit codes, that is, codes that indicate which workgroup has been assigned to handle the issue.

Late breaking automator 68 is a software process concerned with redistributing information when an engineer for either provisioning system determines that the initial allocation of circuit requests to provisioning systems was incorrect. This may involve a determination that an ASR component originally classified as being for one provisioning system should actually be classified as being allocated to the other provisioning system or to both systems. Conversely, it may involve a determination that an ASR component originally classifies as being allocated to both provisioning systems should actually be classified to just one provisioning system or the other. As an example of this, an engineer on the TDM network provisioning system may discover that while initial and terminal segments of a circuit can be provisioned as TDM circuits, one or more intermediate segments may need to be provisioned using the packet network provisioning system. This discovery may cause the engineer to invoke the late breaking automator to pass the necessary information to the packet network provisioning system.

Reference number ("refnum") manager 70 is a software process concerned with invoking the redistribution functionality of the late breaking automator 68 for each component of an ASR.

Design layout report (DLR) automator 72 is a software process that may be concerned with obtaining design layout reports of the provisioned resources from the one or more provisioning systems involved in the provisioning of a given ASR. The DLR automator may further combine DLRs from different provisioning systems to form a single DLR for the ASR, and may communicate the single DLR to the order entry system.

Figure 4:
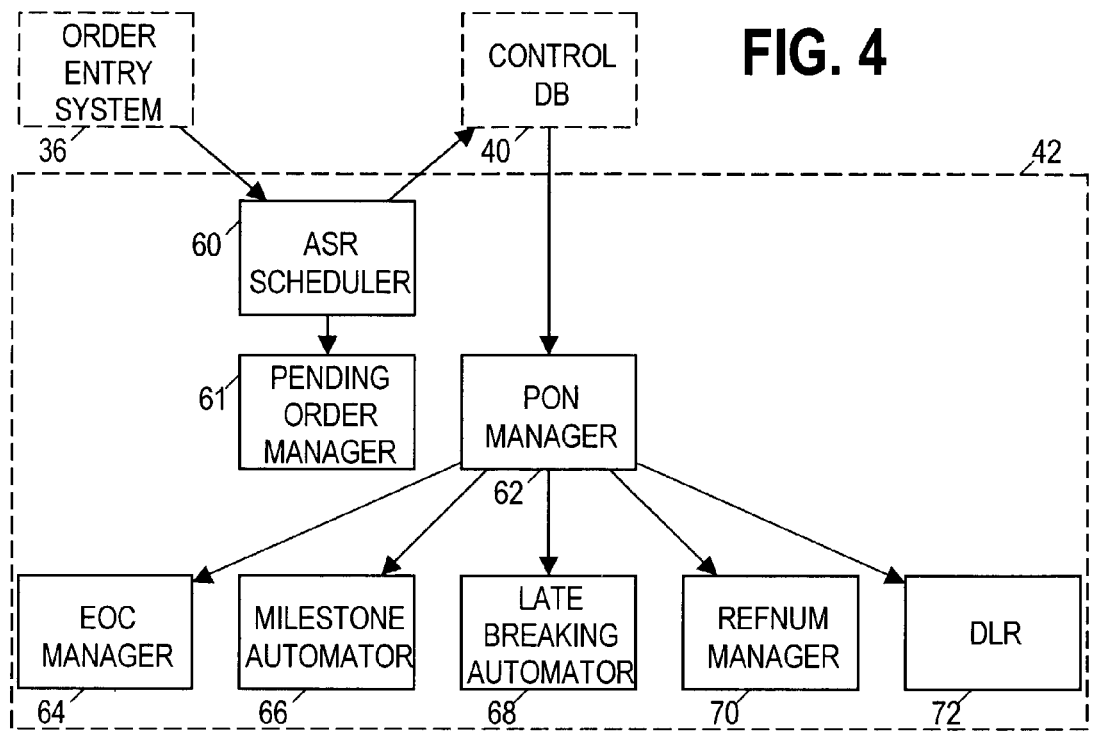
FIG. 4 shows a hierarchy of relationships between process modules in certain system embodiments.

The relationships shown in FIG. 4 may be only a subset of the interrelationships between the various software processes. The hierarchical relationships shown may serve to primarily indicate the initial invocation of a process. This is expected to be helpful in understanding the functions of the various software processes as explained further below, but should not be taken as a complete indication of their interrelationships.

Figure 5A:
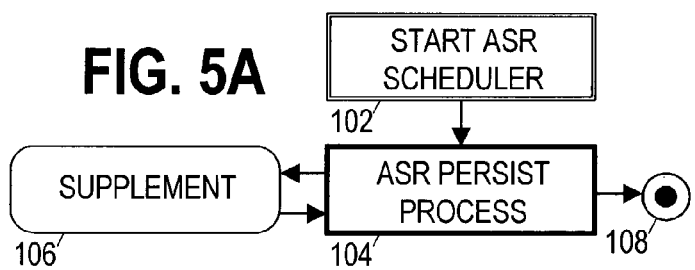
FIGS. 5A-5B show an embodiment of a scheduler process and its subprocesses.

FIG. 5A shows the ASR scheduler process, which may be initiated by the receipt of an ASR. Upon receiving header information about the ASR, the scheduler process transitions from start state 102 to nested state 104, initiating various subprocesses that are described below with respect to FIG. 5B. As the transition occurs, the scheduler process creates a unique identifier for that ASR and sends the ASR header information to control database 40 for archiving. Note that the order entry system may provide a supplement to a previously created ASR, such as, e.g., a cancellation of the request or a change to the due date (i.e., the date that access is to be made available). Upon receiving such a supplement, the process transitions out of nested state 104 (thereby terminating the subprocesses) and into intermediate state 106. During this transition, the process may send the supplement information to the control database 40 for archiving. From state 106 the process returns to nested state 104, restarting the subprocesses. Upon receiving a close-order command from the PON manager process (described further below), the process exits the nested state 104 and reaches termination state 108, which ends the process.

Figure 5B:
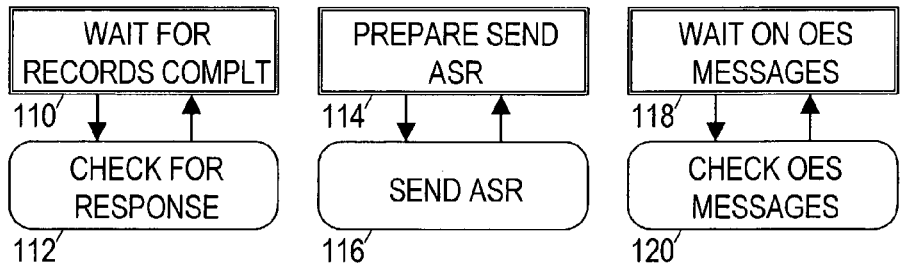

Nested state 104 triggers three subprocesses as shown in FIG. 5B. The first subprocess begins with start state 110, in which the subprocess process waits for acknowledgements from the control database 40 that the ASR information has been archived, or for a message from the PON manager process (described further below) that a serialization process has been completed. (The serialization process involves the assignation of inventory numbers, or "serial numbers" to components of an order.) When such messages are received, the process transitions to state 112, executing some internal logic as it does so, and returns back to start state 110. The internal logic counts acknowledgements from the control database, and when the number of acknowledgements equals the number of records in the ASR, the subprocess sends a message to the second subprocess. This message may alternatively be sent upon receiving notice from the PON manager process that the serialization process is complete.

The second subprocess begins with start state 114, where the process waits for messages from the first subprocess. When messages are received the process transitions to state 116 (executing some internal logic as it does so) and returns back to start state 114. The internal logic verifies that all the successful acknowledgements have been received from the control database, and if so, sends a request to the control database for the ASR data. The process may also initiate the pending order manager process 61 (described further below).

The third subprocess begins with start state 118, where the process waits for messages from the order entry system 36. These messages may provide data regarding various portions of the ASR, including administrative fields, milestone information, circuit information, virtual connection information, transmission questionnaires, service action information, end office details, and a trailer record. As each message is received, the subprocess process cycles between states 120 and 118, duly forwarding each message to the control database for assembly and archiving of the complete ASR.

Figure 6:
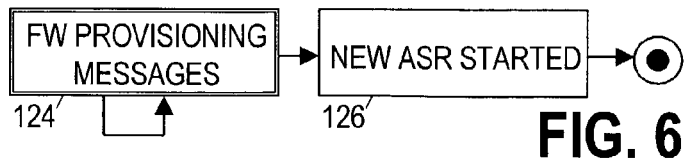
FIG. 6 shows an embodiment of a pending order manager process.

FIG. 6 shows the pending order manager process 61. This process serves as a bypass, allowing messages for preexisting in-process orders to pass from the TDM provisioning system to the order entry system. The process waits in start state 124 for messages from the TDM provisioning system, and performs a circular transition to state 124 to forward those messages to the order entry system. Upon receiving an initiation message from the ASR scheduler (which may indicate a resubmission of the ASR), the pending order manager process transitions to state 126. In state 126 the process waits until a completion message is received from the PON manager, and terminates.

Figure 7A:
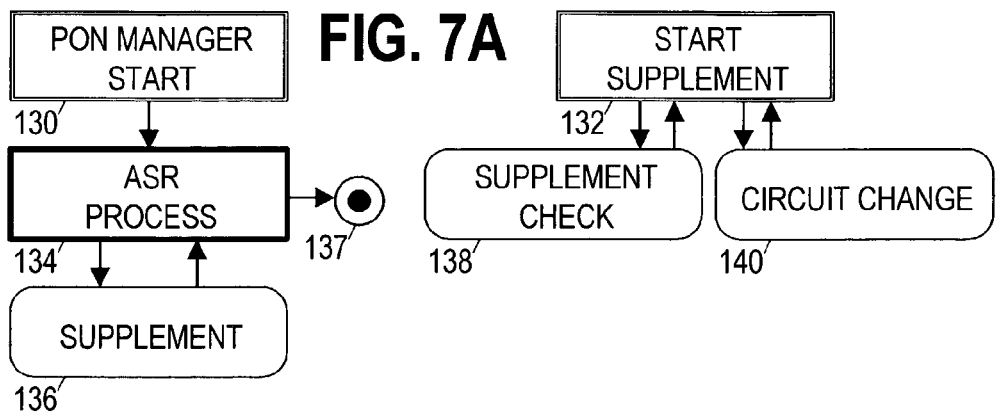
FIGS. 7A-7B show an embodiment of an order manager process and its subprocesses.

FIG. 7A shows the PON manager process 62, which may include two start states 130, 132. PON manager process 62 may be initiated by receipt of an ASR acknowledgement from the control database. Upon receiving an acknowledgement message containing information about a new ASR, the process transitions to nested state 134, thereby initiating the subprocess of FIG. 7B (described further below). If a supplement to the ASR is received, the process cycles from state 134 to state 136 and back, thereby restarting the subprocess. When the subprocess terminates internally, the process transitions from state 134 to termination state 137.

The process may transition out of start state 132 to state 138 upon receiving supplement information from the control database. As the process transitions back to start state 132, it may issue close messages to the processes previously triggered by the PON manager subprocess (described with reference to FIG. 7B), and may trigger the previously mentioned transition from nested state 134 to state 136. The PON manager process may further transition from state 132 to state 140 upon receiving a circuit change message from the control database. As the process cycles back to state 132, it may send a change circuit message to the DLR process (described further below).

Figure 7B:
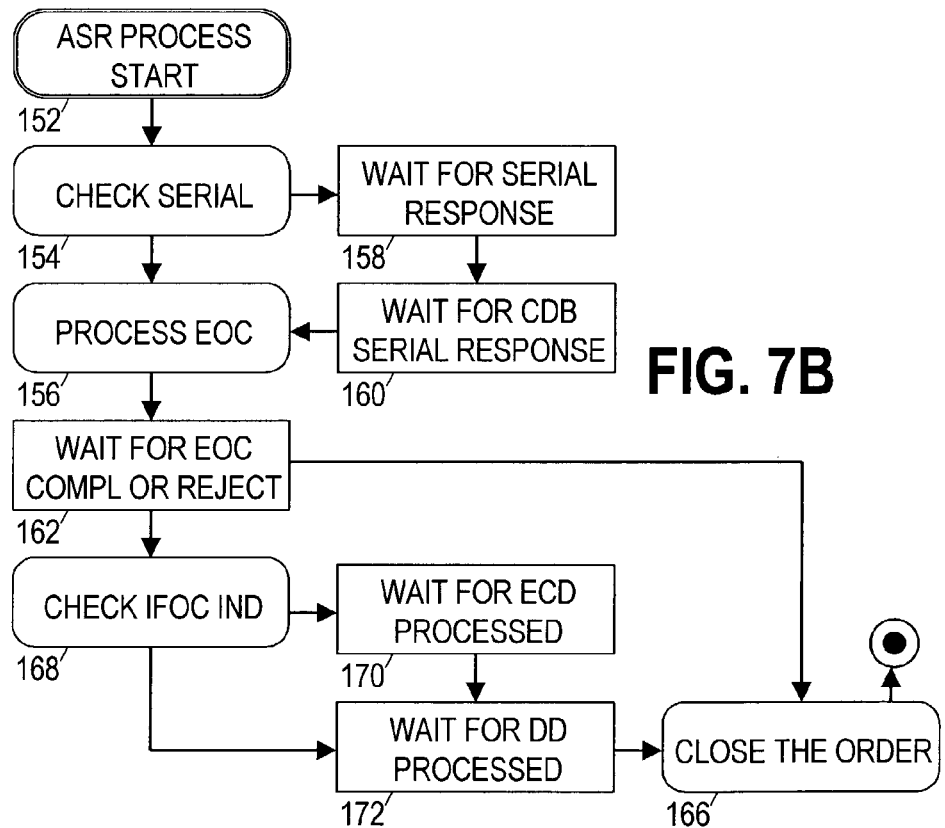

As the PON manager process enters nested state 134, the subprocess of FIG. 7B is initiated. From start state 152, the subprocess immediately transitions to state 154. In state 154 the subprocess determines whether the ASR requires a serial number to be associated with the provisioned circuits. If not, then the subprocess transitions directly to state 156. Otherwise, the subprocess sends a message to the inventory database requesting one or more new serial numbers as the subprocess transitions to state 158. The subprocess waits in state 158 until the serial numbers are received. As the subprocess transitions to state 160, the serial numbers are forwarded to the control database, and a message is sent to notify the ASR scheduler process that the serial numbers have been obtained. The subprocess transitions from wait state 160 to state 156 when the control database acknowledges receiving the serial numbers.

From state 156, the subprocess transitions to state 162, sending messages to initiate the EOC process and the milestone process. From state 162, the subprocess may transition to state 166 upon receiving a "cancel order" message from the EOC process. From state 166 the subprocess transitions to a terminate state.

Returning to state 162, the subprocess may transition to state 168 upon receiving a message from the EOC process indicating that an EOC response has been received and accepted by the order entry system. As it does so, the subprocess sends messages to initiate the late breaking, refnum, and if required, the DLR processes.

In state 168, the subprocess determines whether an estimated completion date (ECD) has been requested, and if so, it transitions to state 170 to wait for a message from the milestone process indicating that the ECD has been determined. In state 172, the subprocess waits for a message from the milestone process indicating that the actualized due date (the activation date) has been determined. When the message is received, the subprocess transitions to state 166, sending "close order" messages to the provisioning systems, the EOC process, the refnum process, the late breaking process, the ASR scheduler process, the DLR process, and the pending order process. Also, a message may be sent to the control database indicating completion of the ASR.

Figure 8A:
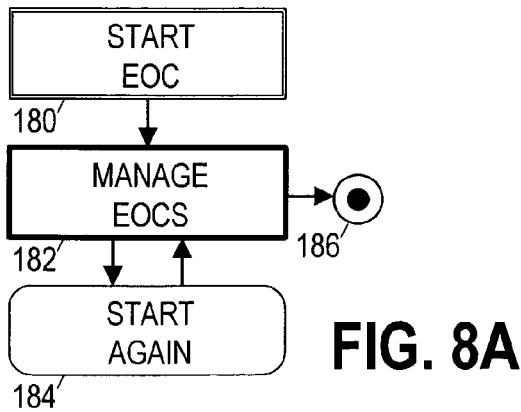

FIG. 8A shows the EOC manager process which is initiated by the PON manager process and transitions from start state 180 to nested state 182 upon receiving a start message from the PON manager. Receipt of a subsequent start message will cause the process to cycle out of nested state 182 to state 184 and back again, thereby restarting the subprocesses triggered by nested state 182. The process may transition from state 182 to terminate state 186 upon receiving a close message from a time stamp subprocess (described further below with reference to FIG. 8E).

FIG. 8B shows the "EOC main" subprocess (hereafter, "main subprocess") which is initiated by nested state 182. From start state 190, the main subprocess transitions to state 192, setting a "first time" flag to true. (If state 192 is reached by the transition from state 208, the first time flag will be false.) From state 192, the main subprocess transitions to fork 193, sending a start message to the time stamp subprocess. The main subprocess may further zero some counters that may be used in nested subprocesses to track responses from the provisioning systems. At fork 193, the subprocess forks, creating two parallel paths that are taken to reach states 194 and 196 concurrently. Momentarily focusing on the first path, the main subprocess checks in state 194 to determine whether the ASR has a packet circuit component—i.e., whether the ASR requires any provisioning from the Packet provisioning system. If not, the main subprocess bypasses nested state 198 to reach state 200. Otherwise, the main subprocess enters nested state 198, initiating an EOC packet subprocess described further below with reference to FIG. 8C. When the packet subprocess terminates, the main subprocess transitions to state 200. From state 200, the main subprocess reaches join 201 and proceeds from there to state 206 only when both parallel paths have reached join 201.

On the other path, in state 196 the main subprocess determines whether the ASR requires any provisioning from the TDM provisioning system. If not, the main subprocess bypasses nested state 202. Otherwise, the main subprocess enters nested state 202 thereby initiating the EOC TDM subprocess. When the TDM subprocess has completed, the main subprocess exits nested state 202 and passes through state 204 to join 201.

When the main subprocess has reached join 201 through both paths, the main subprocess enters state 206 and immediately transitions to state 208. During the transition, the main subprocess sends (via the timestamp subprocess) messages to the circuit database providing EOC information for hybrid and packet circuits. The main subprocess also sends a message to provide the EOC information to the control database and the order entry system. In state 208, the main subprocess waits for an indication from the time stamp subprocess that the order entry system has acknowledged receipt of the EOC information. Upon receiving such an indication, the main subprocess transitions to state 192, sending a message to the PON manager (FIG. 7B) indicating that the EOC process has completed.

FIG. 8C shows the packet EOC subprocess initiated by nested state 198. Beginning with start state 210, the packet subprocess immediately transitions to wait state 212, executing some logic as it does so. The logic determines whether the first time flag is set to True, and if so, it sends a provisioning request to the Packet Provisioning system. In addition, it tests to determine whether the circuit type has changed so that the TDM provisioning system is no longer involved, and if so, it sends a message to the TDM provisioning system to cancel any previous provisioning request.

In state 212, the packet subprocess waits for communications from the packet provisioning system (via the timestamp subprocess of FIG. 8E), transitioning to state 214 each time a header, firm order confirmation, or trailer message is received. Each time a message is received, the packet subprocess may forward the information to the control database and increment a record count. The trailer message may also cause a trailer flag to be set to indicate the trailer message has been received. From state 214, the packet subprocess may immediately return to state 212. Any errors reported by the control database cause the packet subprocess to transition to state 216, logging the error messages during the transition, and to return immediately to state 212. Acknowledgements from the control database cause the packet subprocess to transition to state 218 and increment an acknowledgement count. In state 218, the packet subprocess may determine whether all acknowledgments have been received by comparing the acknowledgement count to the record count, and also determining whether the trailer flag has been set. If so, the packet subprocess terminates, and if the ASR includes a TDM component, the packet subprocess sends a message to the TDM subprocess indicating that the packet provisioning has completed. Otherwise, it transitions back to state 212.

FIG. 8D shows the TDM EOC subprocess triggered by nested state 202. In start state 220, the TDM subprocess determines whether the first time flag is set and whether the ASR has a TDM component. If not, the TDM subprocess transitions to wait state 222. Otherwise, the TDM subprocess transitions to state 224. In state 224, the TDM subprocess determines whether the ASR component includes a packet component. If not, then the TDM subprocess transitions to state 222, sending a provisioning request to the TDM provisioning system. In addition, it determines whether the circuit type has changed so that the packet provisioning system is no longer involved, and if so, sends a message to the packet provisioning system to cancel any previous provisioning request. If the ASR does not include a packet component, then from state 224 the TDM subprocess transitions to state 232. In state 232 the TDM subprocess waits for a completion message or a termination message from the packet subprocess. For the latter, the TDM process terminates. If the former is received, the TDM subprocess transitions to state 222, sending a provisioning request to the TDM provisioning system.

In state 222, the TDM subprocess waits for messages from the TDM provisioning system. As header, firm order confirmation, and trailer messages are received, the TDM subprocess transitions to start 226 and back, forwarding the messages to the control database and incrementing a record count. Also when a trailer message is received, a trailer flag is set. If the control database sends any error messages, the TDM subprocess transitions to state 228 and back, logging the error messages. The TDM subprocess responds to acknowledgement messages from the control broker by transitioning to state 230, incrementing an acknowledgement count as it does so. In state 230, the TDM subprocess may determine whether all the acknowledgements have been received by comparing the acknowledgement count to the record count and also by determining whether the trailer flag has been set. If both conditions are satisfied, the TDM subprocess may terminate.

Figure 8E:
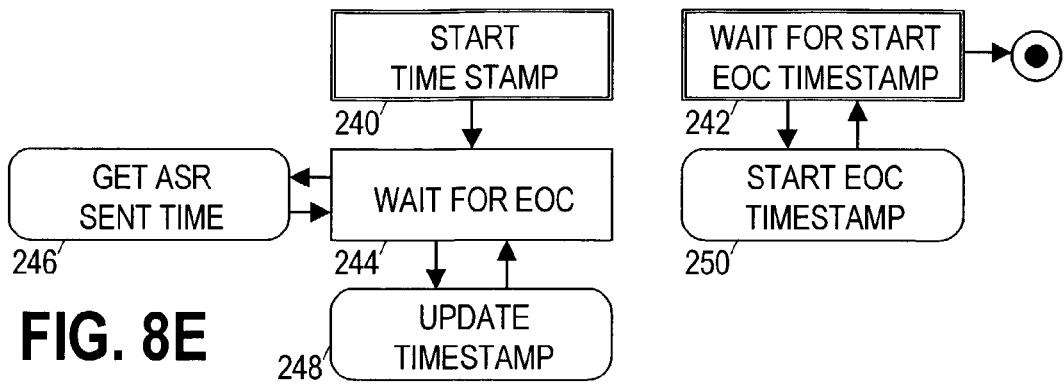

FIG. 8E shows the EOC time stamp subprocess, which may include two start states 240, 242. From start state 240, the time stamp subprocess transitions to state 244 upon receiving a start message from the subprocess having the other start state. The time stamp subprocess waits in state 244 from messages from the order entry system, the packet provisioning system, and the TDM provisioning system. Upon receiving an EOC acceptance message from the order entry system, the time stamp process transitions to state 246, determining the ASR sent time and forwarding the acceptance to the main subprocess (FIG. 8B). From state 246, the timestamp subprocess returns immediately to state 244.

Upon receiving a header, firm order confirmation, or trailer message from the either the packet provisioning or TDM provisioning systems, the time stamp subprocess transitions to state 248, forwarding the message information to the packet or TDM subprocesses as appropriate. For header messages, the timestamp subprocess also tracks the time lapse between the ASR sent time and the EOC sent times. From state 248, the timestamp subprocess returns immediately to state 244.

From start state 242, the timestamp subprocess transitions to state 250 when a start message is received from the main subprocess. This subprocess also sends a start message to cause the transition from state 240 to 244. Some log initialization is performed. The log progresses as the other subprocess tracks ASR/EOC sent time pairs. The timestamp subprocess terminates upon receiving a close message from either the late-breaking subprocess (described below with reference to FIGS. 10A-10F) or the PON manager process. As it terminates, the log is published to a file.

Figure 9A:
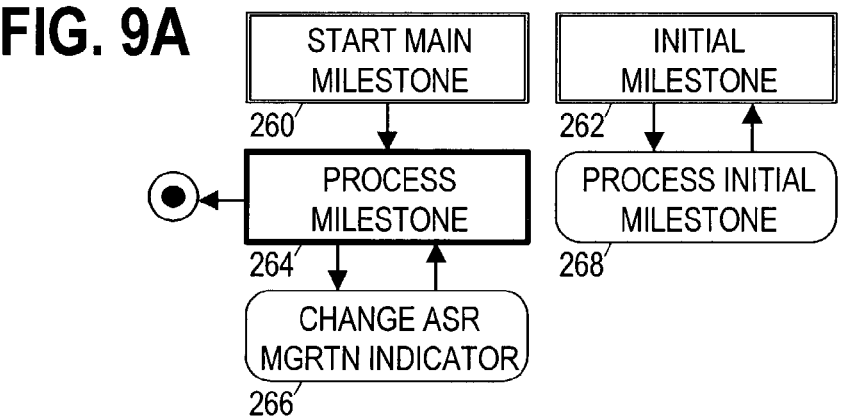
FIGS. 9A-9E show an embodiment of a milestone management process and its subprocesses.

FIG. 9A shows the milestone process, which may include two start states 260 and 262. From start state 262, the milestone process transitions to state 268 and back again when an initial milestone record is received from the order entry system. The milestone process stores this initial record for use by the various subprocesses. The milestone process transitions from start state 260 to nested state 264 when a start message is received from the PON manager (FIGS. 7A-7B). As the milestone process enters nested state 264, it initiates the subprocess of FIG. 9B (described further below). The milestone process terminates when the subprocess completes or when a close message is received from the PON manager process. The milestone process may transition from state 264 to state 266 and back (thereby restarting the nested subprocess) if a message is received from the late breaking process indicating a change in the provisioning system to be used.

Figure 9B:
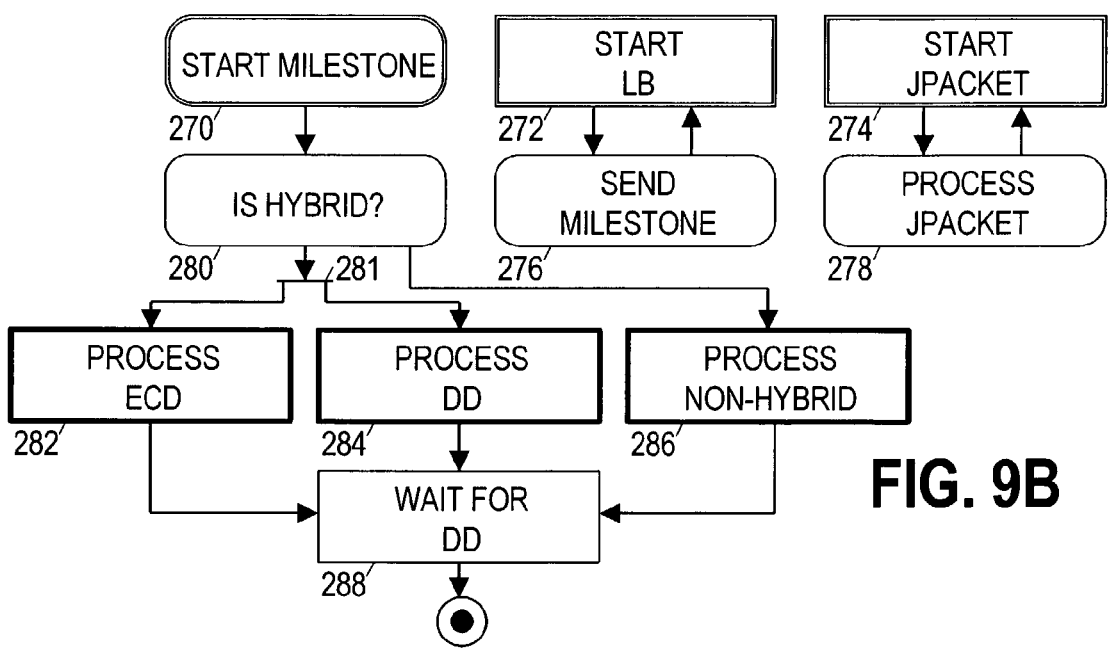

FIG. 9B shows three subprocesses that are nested within state 264. From start state 274, one subprocess transitions to state 278 upon receiving a milestone record from the order entry system. The subprocess forwards the milestone record to the packet provisioning system if the ASR has a packet component, and forwards the milestone record to the TDM provisioning system if the ASR has a TDM component. The subprocess further sends an acceptance message to the order entry system acknowledging receipt of the milestone record. From state 278, the subprocess immediately returns to state 274.

From start state 272, a second subprocess transitions to state 276 upon receiving a message from the late breaking process. If the message indicates that a milestone record should be sent to the order entry system, the subprocess does so. If the message indicates that a milestone should be sent to the provisioning systems, the subprocess determines whether a firm order confirmation has been received from either provisioning system and if so, sends milestone records to the appropriate provisioning systems.

Figure 9C:
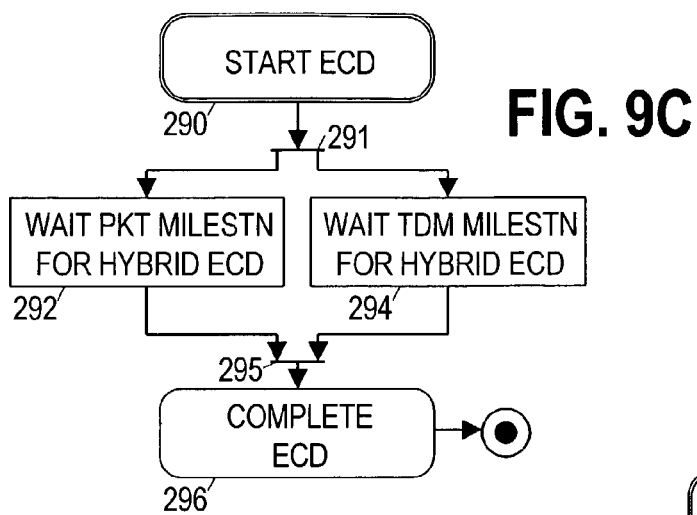
Figure 9D:
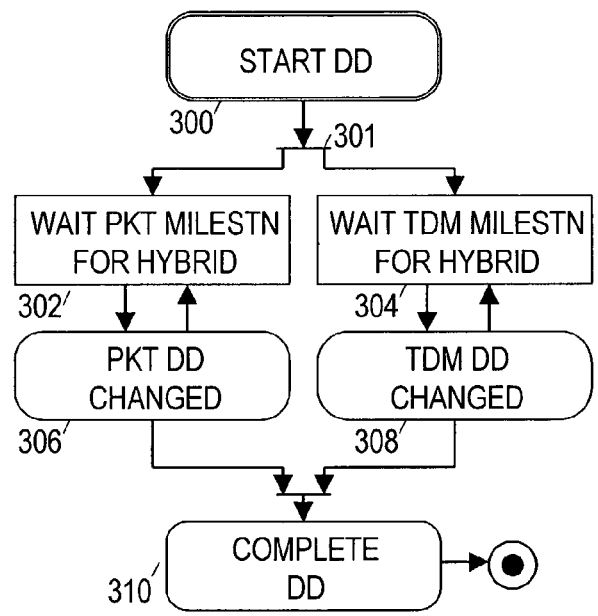

From start state 270, a third subprocess immediately transitions to state 280, where the subprocess determines whether the ASR is a hybrid, i.e. whether it has both packet and TDM components. If so, the subprocess forks to concurrently enter nested states 282 and 284. FIGS. 9C and 9D (discussed further below) show the subprocesses for nested states 282 and 284, respectively. Otherwise, the subprocess transitions to nested state 286, which initiates the subprocess described further below with reference to FIG. 9E. When any of the nested subprocesses have terminated, the milestone subprocess transitions to state 288, verifies proper completion of the subprocesses, and then terminates.

FIG. 9C shows the milestone ECD subprocess. This subprocess and the milestone DD subprocess are only invoked for hybrid orders. The ECD subprocess immediately transitions from start state 290 and forks to reach states 292 and 294 concurrently. The ECD subprocess waits in state 292 to receive a milestone record from the packet provisioning system. If the received milestone record has the ECD set, the ECD subprocess transitions to join 295. The ECD subprocess also waits in state 294 to receive a milestone record from the TDM provisioning system. If the received milestone record has the ECD set, the ECD subprocess transitions to join 295. Once the join has been reached by both paths, the subprocess transitions to state 296, sending a message to the PON manager subprocess (FIG. 7B) indicating that the ECD has been processed. Having reached state 296, the ECD subprocess terminates.

FIG. 9D shows the milestone DD subprocess. From start state 300, the DD subprocess immediately forks to reach states 302 and 304 concurrently. The DD subprocess waits in state 302 for a milestone record from the packet provisioning system. Upon receiving a milestone record, the DD subprocess transitions to state 306, executing some internal logic as it does so. The internal logic may determine whether the milestone record has the DD and FDD fields set, and if so, the internal logic may set a flag and update other dates in the record. Otherwise, the internal logic may update the other dates and forward the milestone information to the order entry system and the control database. In any event, in state 306 the DD subprocess determines whether the flag has been set, and if not, the DD subprocess returns to state 302. Otherwise the DD subprocess progresses to join 307.

In state 304, the DD subprocess waits for a milestone record from the TDM provisioning system. When a milestone record is received, the DD subprocess transitions to state 308, executing the same internal logic as before, setting a flag if the DD and FDD fields have been set, and forwarding the milestone information to the control database and order entry system if not. If the flag has not been set, the subprocess returns to state 304, otherwise it progresses to join 307. Once the subprocess reaches join 307 by both paths, the subprocess progresses to state 310. From state 310, the subprocess transitions to a terminate state, sending the milestone information to the order entry system and control database, and sending a DD processed message to the PON manager subprocess.

Figure 9E:
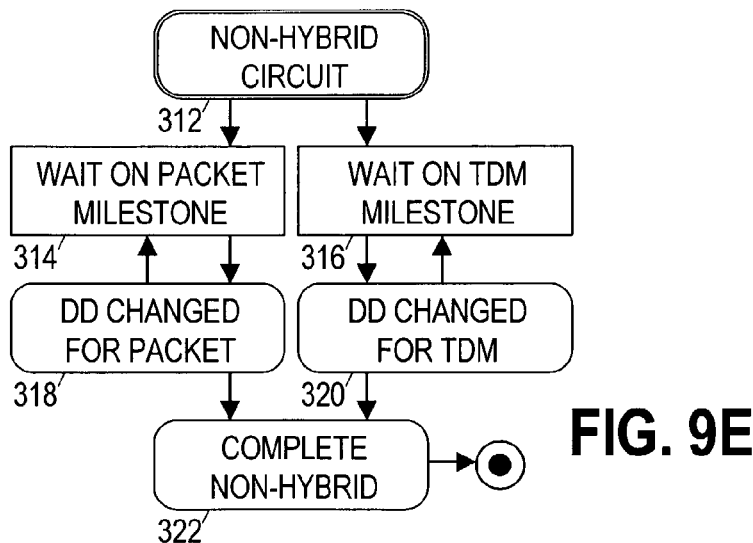

FIG. 9E shows the milestone non-hybrid subprocess. In start state 312, the subprocess determines whether the ASR has TDM or packet components. For packet components, the subprocess transitions to state 314, for TDM the subprocess transitions to state 316.

In state 314, the subprocess waits for a milestone record from the packet provisioning system. Upon receiving a milestone record, the subprocess transitions to state 318, executing internal logic as it does so. The internal logic sets a flag if the DD field has been set, otherwise, the forwards the milestone information to the control database and order entry system. Also, if the ECD field has been set the internal logic sends a message to the PON manager subprocess indicating that the ECD has been determined. In state 318, the subprocess determines whether the flag has been set, and if not, the subprocess returns to state 314. Otherwise the subprocess progresses to state 322.

In state 316, the subprocess waits for a milestone record from the TDM provisioning system. Upon receiving a milestone record, the subprocess executes some internal logic as it transitions from state 316 to state 320. The internal logic sets a flag if the DD field has been set. Also, if the ECD field has been set, the subprocess sends a message to the PON manager indicating that the ECD has been determined. From state 320, the subprocess transition back to state 316 if the flag has not been set, otherwise it transitions to state 322.

From state 322 the subprocess transitions to a terminate state, forwarding the milestone information to the order entry system and control database. A message is also sent to the PON manager subprocess indicating that the DD has been determined.

FIG. 10A shows a late breaking process having two start states 330 and 332. From start state 332, the process transitions to a terminate state when a close message is received from the PON manager.

When a start message is received from the PON manager, the process transitions from start state 330 to fork 331, and thence to both states 334 and 336. In state 334, the late-breaking process waits for either a message from the PON manager requesting a DLR upload circuit change or a message from the refnum process initiating a late breaking change. In the case of the former, the late breaking process may update information regarding a circuit in the queue. In the case of the latter, the late breaking process may add a late breaking event to the queue. In either case, the late breaking process transitions to state 338 and back to 334.

In state 336 the late breaking process determines whether the queue is empty, and if so, it transitions to state 340 where it waits for an addition to the queue. If the queue is not empty, then the late breaking process transitions to nested state 342 to process the late breaking event. When the nested subprocess completes, the late breaking process returns to state 336.

FIG. 10B shows the main subprocess initiated by the late breaking process's entering nested state 342. From start state 350, the main subprocess transitions to nested state 352, initiating a preprocessing subprocess described further below with respect to FIG. 10C. When the preprocessing subprocess completes, the main subprocess transitions to state 354. In state 354 the main subprocess determines whether the event is a circuit move to the TDM provisioning system, a dual circuit override to the TDM provisioning system, a late breaking dual, a circuit move to the packet provisioning system, or a dual circuit override to the packet provisioning system. For a circuit move to, dual override to, or late breaking dual from the TDM provisioning system, the main subprocess transitions to state 356. For a circuit move to or dual override to the packet provisioning system, the main subprocess transitions to state 360. For late breaking dual from the packet provisioning system, the main subprocess transitions to state 358. States 356, 358, and 360 are nested states that initiate subprocesses shown respectively in FIG. 10D, 10F, and 10E. When the corresponding subprocess has completed, the main subprocess transitions to state 362.

In state 362, the main subprocess determines whether an EOC response needs to be sent to the TDM provisioning system (e.g., if the TDM provisioning system is being used). If so, the main subprocess transitions to state 364, sending EOC response messages to both the TDM and packet provisioning systems. Otherwise, the main subprocess transitions directly to state 366, sending an EOC response message only to the packet provisioning system.

In state 364, the main subprocess waits for an acknowledgement that the message has been sent to the TDM provisioning system before transitioning to state 366. From state 366 the main subprocess transitions to terminate state 368, sending a milestone message to the milestone subprocess.

FIG. 10C shows the preprocessing subprocess that is nested within state 352. When initiated, the preprocessing subprocess immediately transitions from start state 370 to state 372, sending an update message to the control database to update the migration indicator to reflect the change to a new provisioning system. The subprocess waits in state 372, transitioning to state 374 upon receiving an acknowledgement from the control database. As the subprocess transitions to state 374, it sends a close message to the EOC subprocess. From state 374 the subprocess transitions to state 376, sending a message to notify the milestone subprocess of the change. From state 376, the subprocess transitions to a terminate state, sending messages to any DLR subprocesses to notify them of the change.

FIG. 10D shows the packet circuit move subprocess nested within state 360, which may coordinate a circuit move to or dual override to the packet network provisioning system. The subprocess waits in start state 380 for an EOC header message from the TDM provisioning system. Upon receiving the message, the subprocess determines in state 382 whether the EOC trailer has been received from the TDM provisioning system. If not, then the subprocess transitions to state 384. Subsequent EOC messages from the TDM provisioning system cause the subprocess to transition from state 384 to state 382 to determine whether the EOC trailer has been received. If not, the subprocess returns to state 384. Otherwise, the subprocess transitions to state 386, sending a message to the packet provisioning system requesting that provisioning be provided. The subprocess waits in state 386 for an EOC header message from the packet provisioning system. When the message is received, the subprocess transitions to state 388 to determine whether an EOC trailer message has been received from the packet provisioning system. If so, the subprocess terminates. Otherwise the subprocess transitions to state 390, returning to state 388 each time an EOC message is received from the packet provisioning system.

FIG. 10E shows the TDM circuit move subprocess nested within state 356, which may coordinate a circuit move to, dual override to, or late breaking dual from the TDM network provisioning system. The subprocess waits in start state 400 for a header message from the packet provisioning system. When the message is received, the subprocess transitions to state 402, forwarding the header message information to the control database. In state 402, the subprocess determines whether the EOC trailer message has been received and all the EOC messages from the packet provisioning system have been acknowledged by the control database. If not, the subprocess transitions to state 404 to await a subsequent EOC message or acknowledgement from the control database. Each time an EOC message is received from the packet provisioning system, the subprocess forward the information to the control database. Each time an acknowledgement is received from the control database, the subprocess returns to state 382 for a recheck. Once the trailer message and acknowledgements have been received, the subprocess transitions to state 406 to wait for an EOC header from the TDM provisioning system. The subprocess transitions to state 408 when the EOC header message is received. In state 408, the subprocess determines whether an EOC trailer message has been received from the TDM provisioning system, and if so, the subprocess terminates. Otherwise the subprocess transitions to state 410 to await subsequent EOC messages from the TMD provisioning system. As those messages are received, the subprocess returns to state 408.

FIG. 10F shows the late breaking dual subprocess nested with state 358, which may coordinate late breaking duals from the packet provisioning system. From start state 420, the subprocess immediately forks to reach states 422 and 424 concurrently. In state 422, the subprocess waits for an EOC header message from the packet provisioning system, and when the message is received, the subprocess transitions to state 426 to determine whether an EOC trailer message has been received. The subprocess cycles between states 426 and 428 as EOC messages are received until the trailer message has been received. Once the trailer message has been received, the subprocess reaches join 427 by a first path.

In state 424, the subprocess waits for an EOC header message from the TDM provisioning system. When the message is received, the subprocess transitions to state 430 to determine whether the EOC trailer message has yet been received, and if so, the subprocess reaches join 427 by a second path. Otherwise, the subprocess cycles between states 430 and 432 as EOC messages are received until the EOC trailer message is received. The subprocess terminates when join 427 is reached by both paths.

FIG. 11A shows the reference number ("refnum") manager process. When the PON manager process initiates the refnum manager process, the process transitions from start state 440 to nested state 442, thereby initiating the subprocess of FIG. 11B. When the PON manager process sends a close message to the refnum process, the refnum process exits nested state 442 (thereby terminating the subprocess of FIG. 11B) and terminates.

FIG. 11B shows the nested subprocess of state 442. From start state 444 the subprocess immediately transitions to state 446, determining an active circuit count. The subprocess decrements the active circuit count and transitions from state 446 to state 448 whenever a message is received indicating a late breaking change from either the TDM provisioning system or the packet provisioning system. If the active circuit count is greater than zero, the subprocess returns to state 446, otherwise it transitions to state 444, sending a message to the late breaking subprocess to initiate the processing of the late breaking change.

Figure 12A:
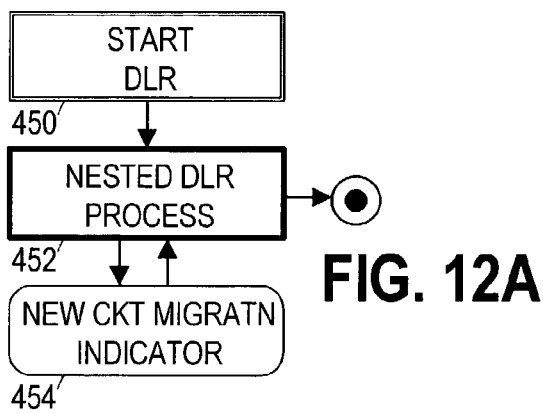
FIGS. 12A-12E show an embodiment of a design layout request management process and its subprocesses.

FIG. 12A shows the DLR process which may be initiated by a message from PON manager process or a restart message which may be triggered by a message from the PON manager changing the circuit identifier. Such messages cause the process to enter nested state 452, thereby initiating the DLR subprocess of FIG. 12B. The process may exit state 452 to reach state 454 in response to a change to the circuit migration indicator. This causes the subprocess to terminate and restart as the process returns to state 452. The DLR process may further transition from state 452 to a terminate state in response to either a close message from PON manager subprocess, or in response to a change circuit identifier message from the PON manager subprocess. In the case of the former, the DLR process simply terminates. In the case of the latter, the DLR process sends a restart message to re-initiate itself with a new circuit identifier.

Figure 12B:
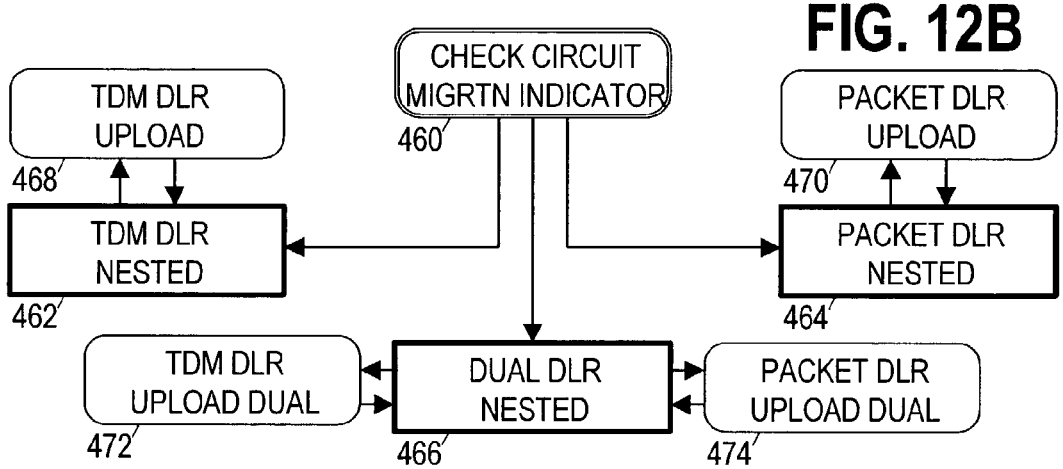

FIG. 12B shows a decision subprocess that is initiated by nested state 452. In start state 460, the decision subprocess determines whether the circuit migration indicator indicates a TDM circuit, a packet circuit, or a hybrid (combination) circuit. For a TDM circuit, the decision subprocess transitions to nested state 462. For a packet circuit, the decision subprocess transitions to nested state 464. For a hybrid circuit, the decision subprocess transitions to nested state 466.

When decision subprocess enters nested state 462, it initiates the subprocess of FIG. 12C (described further below). Upon receiving an upload message from the TDM provisioning system, the decision subprocess transitions to state 468 and back, thereby restarting the nested subprocess. As the transitions occur, the decision subprocess may forward the DLR information to the control database, and set a status variable to indicate that subprocess is to wait on a response from the control database.

When decision subprocess enters nested state 464, it initiates the packet DLR subprocess described further below with respect to FIG. 12D. Upon receiving an upload message from the packet provisioning system, the decision subprocess transitions from state 464 to state 470, forwarding the information to the control database and setting a status variable to indicate that the subprocess is to wait on a response from the control database. The decision subprocess then re-enters nested state 464, restarting the packet DLR subprocess.

When the decision subprocess enters nested state 466, it initiates the dual DLR subprocess described further below with respect to FIG. 12E. Upon receiving an upload message from either the TDM provisioning system or the packet provisioning system, the decision subprocess transitions to either state 472 or state 474, respectively. As these transitions are made, the decision subprocess forwards the DLR information to the control database, sets a status variable to indicate that the subprocess is to wait for a reply from the control database, and returns to nested state 466.

Figure 12C:
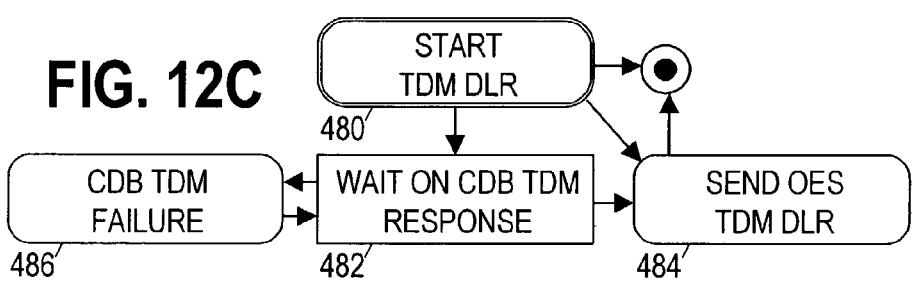

FIG. 12C shows the TDM DLR subprocess nested within state 462. In start state 480, the TDM DLR process determines the value of the status variable. If the status variable indicates that a DLR has not yet been received from the TDM provisioning system, the subprocess terminates. If the status variable indicates that a response is expected from the control database, the subprocess enters state 482 to wait. If an error message is received from the control database, the subprocess cycles to state 486 and back, potentially logging the error message. If an acknowledgement message is received from the control database, the subprocess transitions to state 484.

From state 484 the subprocess transitions to a terminate state, sending the DLR information to the order entry system as it does so.

Figure 12D:
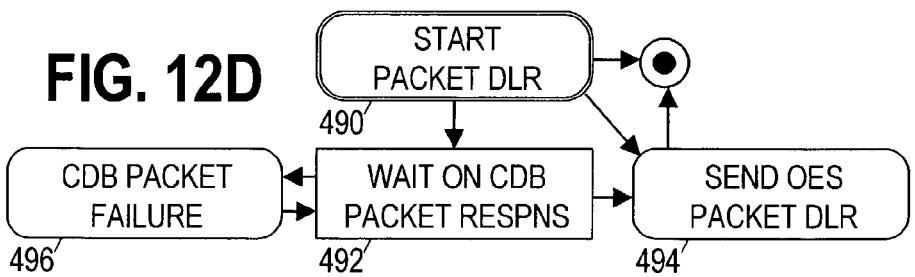

FIG. 12D shows the packet DLR subprocess nested within state 464. In start state 490, the packet DLR subprocess determines the value of the status variable. If the status variable indicates that no DLR has been received from the packet provisioning system, the subprocess terminates. If the status variable indicates that a response is expected from the control database, the subprocess enters state 492 to wait. If an error message is received from the control database, the subprocess cycles to state 496 and back, potentially logging the error message. If the desired response is received from the control database, the subprocess enters state 494. From state 494, the subprocess transitions to a terminate state, sending the DLR information to the order entry system as it does so.

Figure 12E:
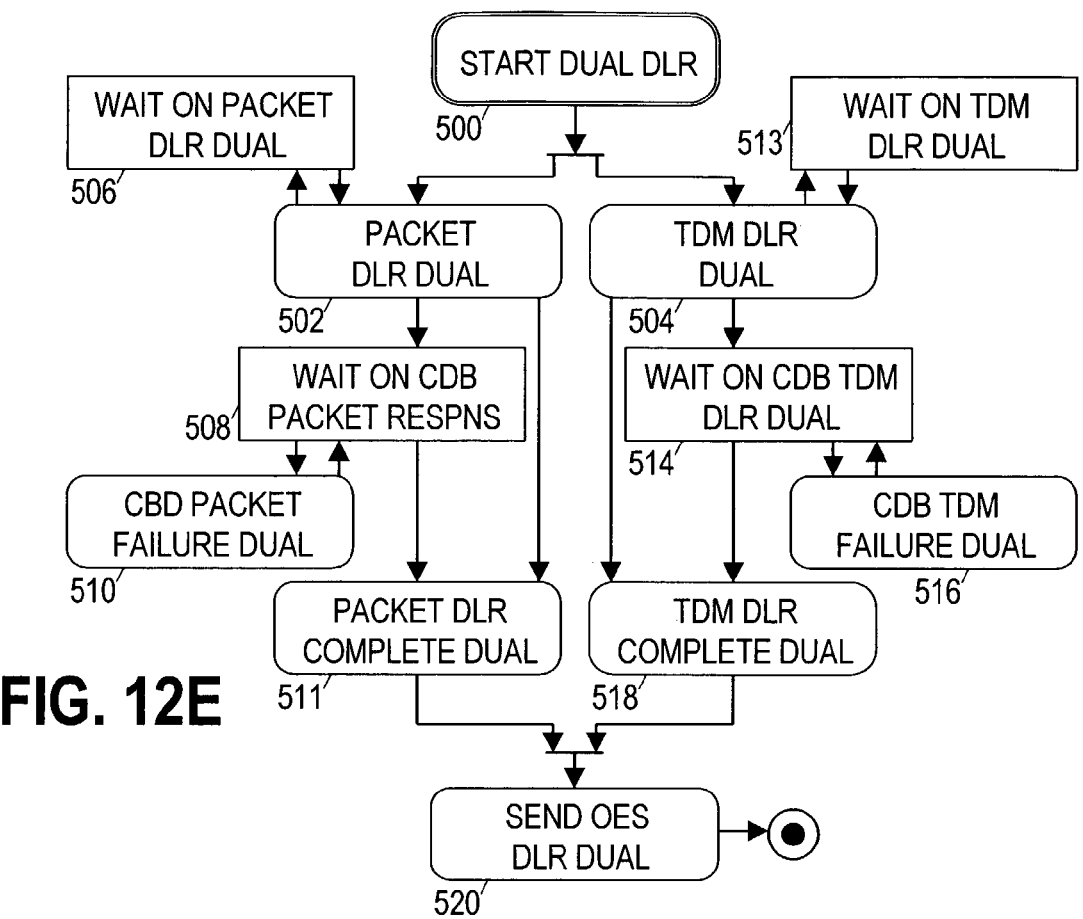
Figure 13:
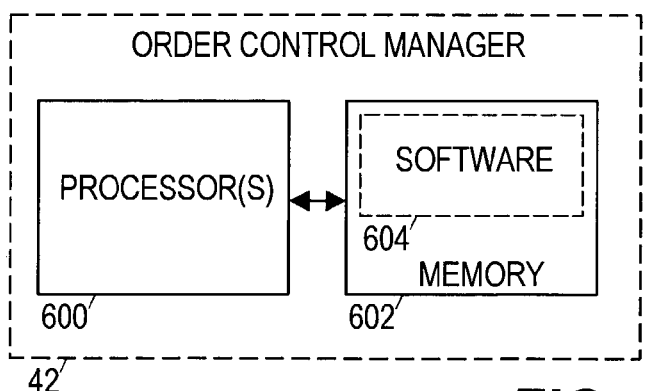
FIG. 13 shows a block diagram of an order control manager embodiment.

FIG. 12E shows a dual DLR subprocess nested within state 466. From start state 500, the dual subprocess forks to reach states 502 and 504 concurrently. In states 502 and 504, the dual subprocess checks the value of state variables for the TDM and packet systems. If the DLR has not yet been received from the TDM provisioning system, the dual subprocess transitions from state 502 to state 506. Similarly, if the DLR from the packet provisioning system has not yet been received, the dual subprocess transitions from state 504 to state 513. Recall that this subprocess will be terminated as the decision process exits nested state 466 in response to a DLR from either provisioning system.

Returning to state 502, if the state variable indicates that a response from the control database is expected, the dual subprocess transitions from state 502 to state 508 to wait. If an error message is received, the dual subprocess cycles to state 510 and back, potentially logging the error. If the expected response is received, the dual subprocess transitions to state 511, and thence to join 512.

Returning to state 504, if the state variable indicates that a response from the control database is expected, the dual subprocess transitions to state 514 to wait. If the response is an error message, the dual subprocess cycles to state 516 and back, potentially logging the error message. If the response is a successful acknowledgement, the dual subprocess transitions to state 518 and thence to join 512.

When join 512 is reached by both paths, the dual subprocess transitions to state 520. From state 520, the dual subprocess transitions to a terminate state, sending the DLR information to the order entry system.

Numerous variations and modifications will become apparent to those skilled in the art once the above disclosure is fully appreciated. It is intended that the following claims be interpreted to embrace all such variations and modifications.

What is claimed is:

1. A system for telecommunications circuit provisioning, the system comprising:
   a first provisioning system, configured to allocate circuit-switched circuits;
   a second provisioning system configured to allocate packet switched circuits; and
   an order control system configured to receive an access request, wherein the access request designates one or more circuits and a starting point, ending point, and bandwidth for the one or more circuits, wherein the order control system is coupled to the first and second provisioning systems, to determine whether the access request includes packet-switched circuits, circuit-switched circuits, or a hybrid of the packet-switched circuits and the circuit-switched circuits, obtain telecommunications circuit allocations for the circuit-switched circuits and the packet-switched-circuits that satisfy the access request based on the determination, and track provisioning to satisfy the access request.

2. The system of claim 1, wherein the order control system is further configured to reclassify the access request in response to an indication from a provisioning system that a current classification is undesirable.

3. The system of claim 2, wherein the order control system is further configured to provide access request information to the first and second provisioning systems in accordance with the classification of the access request, and wherein the order control system is further configured to update the access request information if a reclassification occurs.

4. The system of claim 1, further comprising:
   an order entry system configured to facilitate creation of access requests and coupled to the order control system to provide the access requests,
   wherein the order control system is configured to provide status information to the order entry system regarding access requests received from the order entry system; and
   one or more workstations coupled to the first provisioning system and second provisioning system configured to allow engineers to design, review, and approve the packet-switched circuits, the circuit-switched circuits, or the hybrid circuits.

5. The system of claim 1, further comprising a control database coupled to the order control system and configured to store transaction information provided by the order control system.

6. The system of claim 1, wherein the order control system executes a set of instructions defining software modules, and wherein the software modules include:
   a scheduler module configured to provide access request information to a control database;
   an order manager module configured to receive an acknowledgment from the control database, and further configured to responsively initiate other modules including:
   an engineering order module configured to distribute access request information to the first and second provisioning systems, and configured to combine responses from the provisioning systems as needed to form complete responses to access requests; and
   a milestone module configured to track phase-completion information regarding access requests.

7. The system of claim 6, wherein the order manager module is further configured to initiate a late-breaking module based on user feedback that an initial allocation of circuit requests to the provisioning systems is incorrect, wherein the late-breaking module is configured to redistribute access request information between the provisioning systems when a change in provisioning responsibility occurs.

8. The system of claim 6, wherein the order manager module is further configured to initiate a design report module configured to receive design reports from the first and second provisioning systems, and configured to combine design reports as needed to form a complete report.

9. The system of claim 1, wherein the order control system manages the circuit-switched circuits and packet-switched circuits in a temporary network configuration during a changeover period of circuit-switched technologies and packet-switched technologies.

10. The system of claim 1, wherein the circuit-switched circuits employs time-division multiplexing, and wherein the packet-switched circuits employ an asynchronous transfer mode.

11. A method for performing telecommunications circuit provisioning using an order control system, the method comprising:
- receiving an access service request at the order control system, wherein the access service request designates one or more circuits and a starting point, ending point, and bandwidth for the one or more circuits;
- determining at the order control system whether the access service request is for packet-switched circuits, circuit-switched circuits, or a hybrid of the packet-switched circuits and the circuit-switched circuits;
- providing access service request information to one provisioning system if the access service request relates to a single kind of telecommunications circuit for provisioning the single kind of telecommunications circuit; and
- providing access service request information to multiple provisioning systems if the access service request relates to more than one kind of telecommunications circuit for provisioning the more than one kind of telecommunications circuit.

12. The method of claim 11, further comprising:
- coordinating network management for the packet-switched circuits and the circuit-switched circuits during a changeover period of a network temporarily configured to enable communications as the network is converted from circuit-switched technologies to packet-switched technologies.

13. The method of claim 11, further comprising:
- receiving a notification from a provisioning system indicating that the access service request relates to a different provisioning system; and
- providing access service request information to said different provisioning system.

14. The method of claim 11, further comprising:
- receiving one or more order confirmations from one or more provisioning systems to which the access service request relates;
- forming a complete order confirmation from the one or more order confirmations received;
- providing the complete order confirmation to a source of the access service request;
- receiving one or more design reports from one or more provisioning systems to which the access service request relates;
- forming a complete design report from the one or more design reports received; and
- providing the complete design report to a source of the access service request.

15. The method of claim 11, further comprising:
- transitioning through a plurality of states in a network provisioning system configured to provision the single kind of telecommunications circuit or the more than one kind of telecommunications circuit to satisfy the access service request.

16. A provisioning order control manager that comprises:
- one or more processors; and
- one or more memories coupled to the one or more processors and configured to store a set of instructions for execution by the one or more processors, wherein the set of instructions includes:
  - an order manager module configured to receive access request information, wherein the access request information designates one or more circuits and a starting point, ending point, and bandwidth for the one or more circuits, determine whether an access request involves circuit-switched or packet-switched provisioning systems, and further configured to responsively initiate other modules including:
  - an engineering order module configured to distribute the access request information to one or more telecommunications resource provisioning systems and configured to combine responses from the provisioning systems as needed to form a complete responses to each access request; and
  - a milestone module configured to track phase-completion information regarding each access requests.

17. The manager of claim 16, wherein the order manager module is further configured to receive a notice from the provisioning systems indicating that access request information should be sent to a different telecommunications resource provisioning system, and wherein the order manager module is further configured to initiate a late-breaking module to distribute the access request information to said different provisioning system.

18. The manager of claim 16, wherein the order manager module is further configured to initiate a design report module to receive design reports from the one or more telecommunications resource provisioning systems, and is configured to combine design reports as needed to form a complete report.

19. The manager of claim 16, wherein the set of instructions is configured to post transaction information to a control database.

* * * * *